(12) United States Patent
Noda et al.

(10) Patent No.: US 11,556,554 B2
(45) Date of Patent: Jan. 17, 2023

(54) DISTRIBUTED TRANSACTION MANAGEMENT METHOD AND SYSTEM

(71) Applicant: Hitachi, Ltd., Tokyo (JP)

(72) Inventors: Shotaro Noda, Tokyo (JP); Jumpei Okoshi, Tokyo (JP); Toshihiko Kashiyama, Tokyo (JP); Tsunehiko Baba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/683,705

(22) Filed: Mar. 1, 2022

(65) Prior Publication Data

US 2022/0398555 A1    Dec. 15, 2022

(30) Foreign Application Priority Data

Jun. 11, 2021 (JP) .............................. JP2021-098052

(51) Int. Cl.
*G06F 16/00* (2019.01)
*G06F 16/2458* (2019.01)
*H04L 67/1097* (2022.01)

(52) U.S. Cl.
CPC ...... *G06F 16/2471* (2019.01); *H04L 67/1097* (2013.01)

(58) Field of Classification Search
CPC .......................... G06F 16/2471; H04L 67/1097
See application file for complete search history.

(56) References Cited

U.S. PATENT DOCUMENTS

2016/0210322 A1* 7/2016 Little .................... G06F 9/466

FOREIGN PATENT DOCUMENTS

JP        2013-222439 A    10/2013
WO    WO-2021211025 A1 * 10/2021

* cited by examiner

*Primary Examiner* — Alexander Khong
(74) *Attorney, Agent, or Firm* — Volpe Koenig

(57) ABSTRACT

A distributed transaction in which appropriate patterns are combined without modifying implementation of a management system even when a service characteristic of a participating system changes. A management system receives input of a distributed transaction flow defining respective call sequential numbers of participating systems and service characteristic information representing respective service characteristics of the participating systems. The management system specifies an applied pattern for each of the participating systems based on pattern information including information for each pattern that represents a constraint condition of a service characteristic of a participating system as a call target. The applied pattern is a pattern satisfying the constraint condition corresponding to the service characteristic of the participating system. The management system generates a pattern-applied call program for each of the participating systems, and generates a distributed transaction program based on the pattern-applied call programs and a call sequence of the participating systems.

9 Claims, 14 Drawing Sheets

FIG. 5
PATTERN TABLE
501

| PATTERN | DEPENDENT PATTERN (PREVIOUS) | DEPENDENT PATTERN (SUBSEQUENT) | DEPENDENT PATTERN (HIERARCHY) | CALL SOURCE RESTRICTION | CALL TARGET RESTRICTION | OPTION |
|---|---|---|---|---|---|---|
| XA | - | - | - | XA | XA | - |
| XA (EXCLUSIVE CONTROL) | - | XA, XA (EXCLUSIVE CONTROL) | - | - | - | Yes |
| SAGA (SYNCHRONOUS) | - | - | - | SAGA (SYNCHRONOUS) | SAGA (SYNCHRONOUS) | - |
| SAGA (ASYNCHRONOUS) | - | - | - | SAGA (ASYNCHRONOUS) | SAGA (ASYNCHRONOUS) | - |
| TCC | - | - | SAGA (SYNCHRONOUS) | TCC | TCC | - |
| DISCARD DUPLICATE RECEIVED MESSAGES (SYNCHRONOUS) | SAGA (SYNCHRONOUS) | - | SAGA (SYNCHRONOUS) | SAGA (SYNCHRONOUS), TCC | - | - |
| DISCARD DUPLICATE RECEIVED MESSAGES (ASYNCHRONOUS) | SAGA (ASYNCHRONOUS) | - | SAGA (ASYNCHRONOUS) | SAGA (ASYNCHRONOUS), TCC | - | - |
| Retry (NO DUPLICATE EXECUTION) | - | - | SAGA (SYNCHRONOUS), SAGA (ASYNCHRONOUS), DISCARD DUPLICATE RECEIVED MESSAGES (SYNCHRONOUS), TCC | Retry (NO DUPLICATE EXECUTION) | IDEMPOTENCY (NOT PREVENT DUPLICATE EXECUTION) | ... |
| ... | ... | ... | ... | ... | ... | ... |

FIG. 7

SERVICE CHARACTERISTIC TABLE
701

| SERVICE | SERVICE CHARACTERISTIC |
|---|---|
| PARTICIPATING SYSTEM 1 | SAGA (ASYNCHRONOUS) |
| PARTICIPATING SYSTEM 2 | SAGA (SYNCHRONOUS), TCC, IDEMPOTENCY (PREVENT DUPLICATE EXECUTION) |
| PARTICIPATING SYSTEM 3 | SAGA (SYNCHRONOUS), TCC, IDEMPOTENCY (NOT PREVENT DUPLICATE EXECUTION) |
| PARTICIPATING SYSTEM 4 | XA |
| PARTICIPATING SYSTEM 5 | XA |

DISTRIBUTED TRANSACTION FLOW
1001

DISTRIBUTED TRANSACTION MANAGEMENT METHOD AND SYSTEM

BACKGROUND OF THE INVENTION

1. Field of the Invention

The present invention generally relates to management of a distributed transaction.

2. Description of the Related Art

In recent years, due to a trend in cloud native and agile development, attention has been focused on microservices architecture. The microservices architecture is one of development methods of a system including a collection of a plurality of small services (microservices), and contributes to improvement of agility and scalability.

In the microservices architecture, the plurality of microservices operate in cooperation with each other, and thus maintenance of data consistency between services becomes an important problem. Here, data consistency (maintenance of data consistency) refers to a state in which data inconsistency does not occur in applications realized by the services, for example, a state such that when money is remitted from an account A to an account B in a remittance between bank accounts, an amount of money withdrawn from the account A is deposited into the account B without excess or deficiency. On the other hand, a state of only withdrawal from the account A and a state of double deposit into the account B are typical examples of occurrence of data inconsistency.

In order to maintain the data consistency, a method called distributed transaction is used. One of typical specifications of the distributed transaction is XA. In XA, the data consistency can be maintained between services using a consensus protocol called two-phase commit. On the other hand, the microservices architecture may be incapable of presupposing a specific consensus protocol (e.g., the two-phase commit in XA) due to necessity for cooperation with an external service, etc. Therefore, a method for realizing a distributed transaction by sequential processing of requests in accordance with an application programming interface (API) of each service (SAGA) has also emerged.

When a distributed transaction (particularly, a distributed transaction including SAGA) is implemented in a system developed by the microservices architecture, a combination of design patterns (hereinafter referred to as patterns) appropriate for system failure and data inconsistency caused by system failure is required. For example, when a distributed transaction management system (a service for managing execution of the distributed transaction) fails to call a participating system (a service participating in the distributed transaction) due to a communication failure (or other reasons), it is necessary to apply a certain pattern in accordance with a service characteristic of the participating system (characteristic of the participating system (e.g., a specification and functions (e.g., implemented applications) of the participating system)) in order to prevent the data inconsistency. For example, when the participating system has idempotence of processing (a property of guaranteeing an internal state to transition to the same state and returning the same result in response to multiple times of the same request), the data inconsistency can be prevented by applying a pattern for re-executing call processing to a call program for calling the participating system.

However, service characteristics and patterns are present in great numbers. Advanced knowledge and a large amount of working hours are required for selecting appropriate patterns respectively corresponding to a plurality of service characteristics and combining such selected patterns.

As a technique of pattern selection, for example, there is a technique disclosed in U.S. Patent Application Publication No. 2016/0210322 (PTL 1). PTL 1 describes a technique of switching a pattern to be applied corresponding to a length of a transaction when a distributed transaction is executed.

In addition, as a technique related to implementation of combined patterns, for example, there is a technique disclosed in JP-A-2013-222439 (PTL 2). PTL 2 describes a technique of generating a program from a template and a parts list.

It is considered that a configuration capable of dynamically switching a program to be applied with a pattern related to distributed transaction can be obtained based on the techniques described in PTL 1 and PTL 2. Specifically, it is considered to automatically generate a program applied with a pattern using the technique described in PTL 2, and to switch the program applied with the pattern using the technique described in PTL 1.

However, when a distributed transaction management system (hereinafter referred to as a management system) that enables generation and switching of a program is to be constructed based on these techniques described in PTL 1 and PTL 2, a problem of increased working hours for implementation arises. That is, a problem arises that a pattern in accordance with a service characteristic of a participating system cannot be applied, and the management system needs to be modified each time the service characteristic changes due to a change in the participating system.

SUMMARY OF THE INVENTION

An objective of the invention is to execute a distributed transaction in which appropriate patterns are combined without modifying implementation of a management system even when a service characteristic of a participating system changes.

A distributed transaction management system receives input of a distributed transaction flow and service characteristic information. The distributed transaction flow is information defining respective call sequential numbers of a plurality of participating systems to be called in a distributed transaction. The plurality of participating systems are each a system participating in the distributed transaction. The service characteristic information is information representing service characteristics as respective characteristics of the plurality of participating systems. The distributed transaction management system specifies an applied pattern for each of the participating systems represented by the service characteristic information, based on pattern information including information for each pattern that represents a constraint condition of a service characteristic of a participating system as a call target. The applied pattern is a pattern satisfying the constraint condition corresponding to the service characteristic of the participating system. The distributed transaction management system generates a pattern-applied call program for each of the plurality of participating systems, and generates a distributed transaction program based on the pattern-applied call programs for the plurality of participating systems and a call sequence represented by the distributed transaction flow. The distributed transaction program includes a plurality of pattern-applied call programs to be executed in the call sequence. The pattern-applied call program for each of the plurality of participating systems is a program obtained by applying a pattern program to a call program whose call target is the participating system. The pattern program is a pattern program of the applied pattern specified for the participating system among a plurality of pattern programs listed for the respective patterns.

According to the invention, it is possible to execute a distributed transaction in which appropriate patterns are combined without modifying implementation of a management system even when a service characteristic of a participating system changes.

BRIEF DESCRIPTION OF THE DRAWINGS

FIG. 5 is a diagram showing a pattern table according to the embodiment.

FIG. 7 is a diagram showing a service characteristic table according to the embodiment.

DESCRIPTION OF THE PREFERRED EMBODIMENTS

Figure 1:
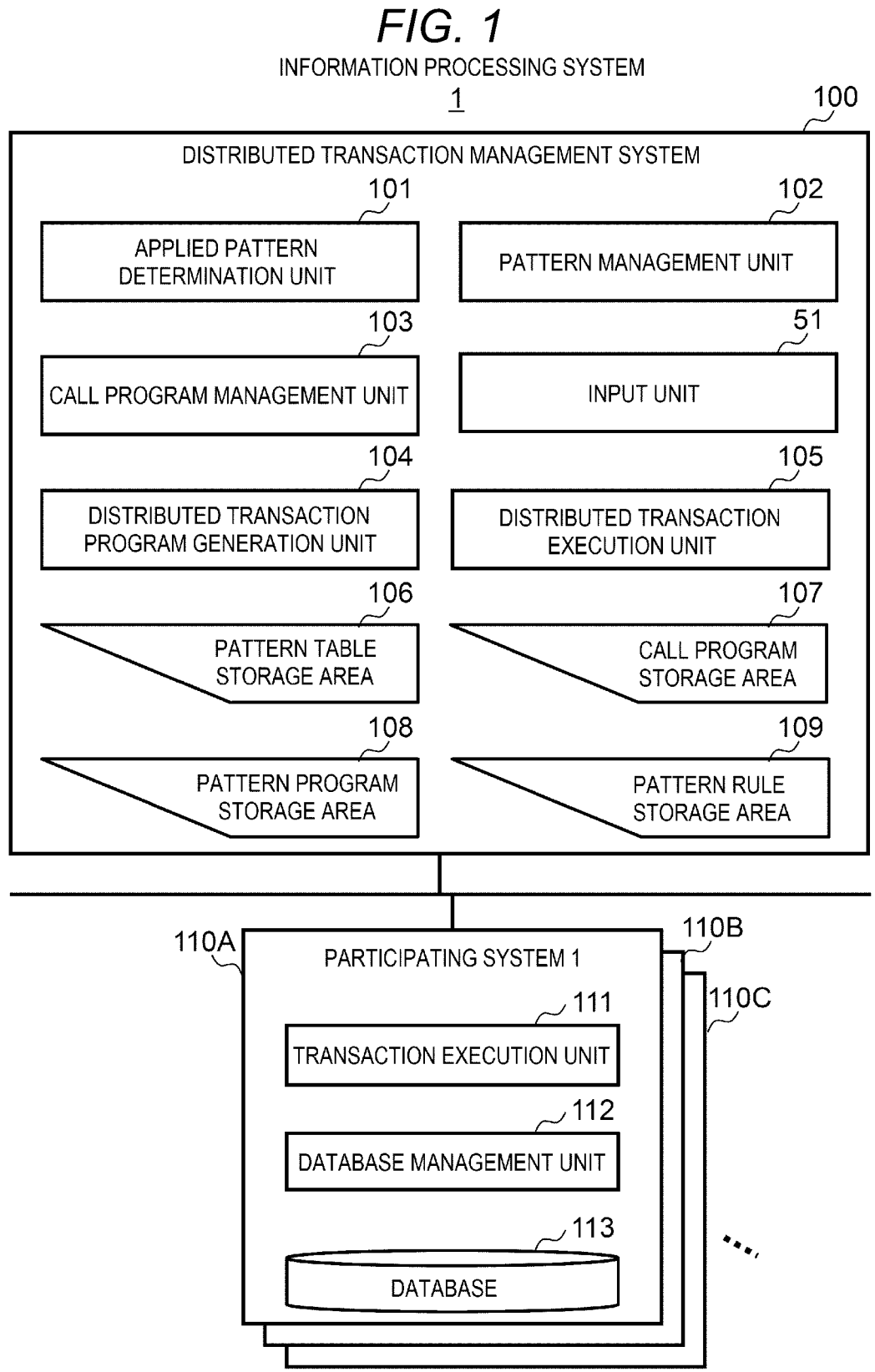
FIG. 1 is a diagram showing a software configuration according to an embodiment.

An embodiment will be described with reference to accompanying drawings. The embodiment described below does not limit the invention according to the claims, and all of the elements and combinations thereof described in the embodiment are not necessarily essential to the solution of the invention.

In the following description, "interface device" may be one or more interface devices. The one or more interface devices may be at least one of the following:

one or more input/output (I/O) interface devices. An I/O interface device is an interface device for at least one of an I/O device and a remote display computer. The I/O interface device for the display computer may be a communication interface device. At least one I/O device may be a user interface device, for example, either an input device such as a keyboard and a pointing device or an output device such as a display device.

One or more communication interface devices. The one or more communication interface devices may be one or more communication interface devices of the same type (e.g., one or more network interface cards (NIC)) or may be two or more communication interface devices of different types (e.g., an NIC and a host bus adapter (HBA)).

In the following description, "memory" is one or more memory devices as an example of one or more storage devices, and may typically be a main storage device. At least one memory device in the memory may be a volatile memory device or a non-volatile memory device.

In the following description, "persistent storage device" may be one or more persistent storage devices as an example of one or more storage devices. Typically, the persistent storage device may be a non-volatile storage device (e.g., an auxiliary storage device), and may specifically be, for example, a hard disk drive (HDD), a solid state drive (SSD), a non-volatile memory express (NVME) drive, or a storage class memory (SCM).

In the following description, "storage device" may be a memory or at least a memory in a persistent storage device.

In the following description, "processor" may be one or more processor devices. Typically, at least one processor device may be a microprocessor device such as a central processing unit (CPU), and may also be another type of processor device such as a graphics processing unit (GPU). At least one processor device may be a single-core processor device or a multi-core processor device. At least one processor device may be a processor core. At least one processor device may be a processor device in a broad sense, such as a circuit (e.g., a field-programmable gate array (FPGA), a complex programmable logic device (CPLD), or an application specific integrated circuit (ASIC)) which is a collection of gate arrays in a hardware description language that performs a partial or entire processing.

In the following description, an expression such as "xxx table" may be used to describe information obtained as an output with respect to an input. The information may be data of any structure (e.g., structured data or unstructured data), or may be a learning model as represented by a neural network, a genetic algorithm, or a random forest that generates an output with respect to an input. Therefore, the "xxx table" can be referred to as "xxx information". Further, in the following description, a configuration of each table is an example, and one table may be divided into two or more tables, or two or more tables may partially or entirely be one table.

In the following description, a processing may be described using "program" as a subject, and since a program is executed by a processor to perform a predetermined processing while appropriately using a storage device and/or an interface device, the subject of the processing also may be a processor (or a device or a system including the processor). The program may be installed in a device such as a computer from a program source. The program source may be, for example, a recording medium (e.g., a non-transitory recording medium) readable by a program distribution server or a computer. In the following description, two or more programs may be realized as one program, or one program may be realized as two or more programs.

In the following description, common reference numerals among reference numerals may be used to describe the same type of elements without being distinguished from each other, and the reference numerals may be used to describe the same type of elements while being distinguished from each other.

In the following description, a name or an ID is adopted as an example of identification information of an element (e.g., a participating system or a pattern), and other types of information also may be adopted instead of or in addition to the name or the ID.

Hereinafter, the embodiment of the invention will be described.

A software configuration of an information processing system according to the present embodiment will be described with reference to FIG. 1. FIG. 1 is a functional block diagram for explaining the software configuration in the information processing system according to the present embodiment.

An information processing system 1 showed in FIG. 1 (hereinafter may simply referred to as "the system 1") is capable of executing a distributed transaction in which appropriate patterns are combined while data consistency is maintained without modifying implementation of a distributed transaction management system 100 (hereinafter may simply referred to as a "management system 100") even when a service characteristic of a participating system changes. The "participating system" is a service (system) participating in the distributed transaction.

As shown in FIG. 1, the system 1 includes the management system 100, which manages the distributed transaction executed in the system, and a plurality of participating systems 110 (110A, 110B, 110C, etc.). In FIG. 1, the management system 100 and the participating systems 110 are showed as different functional blocks, but any two or more among the management system 100 and the participating systems 110, or at least a part of the management system 100 and the participating systems 110, may be configured as one computer. At least one of the management system 100 and the participating systems 110 may be a physical computer system (one or more physical computers) or a logical computer system based on a physical computer system (e.g., a virtual computer system or a cloud computing service system).

In FIG. 1, as will be described in detail later, functional units (51, 101, 102, 103, 104, 105, 111, and 112), storage areas (106, 107, 108, and 109), and a database 113 are showed as different functional blocks, but are not required to be different as hardware. Therefore, operations of each functional unit (51, 101, 102, 103, 104, 105, 111, and 112) may be performed by one or more pieces of hardware, and the storage areas (106, 107, 108, and 109) and the database 113 may be realized by one or more storage devices such as a hard disk drive.

The management system 100 includes an input unit 51, an applied pattern determination unit 101, a pattern management unit 102, a distributed transaction program generation unit 104, a call program management unit 103, a distributed transaction execution unit 105, a pattern table storage area 106, a pattern program storage area 108, a call program storage area 107, and a pattern rule storage area 109.

The participating systems 110 will be described taking a participating system 110A (participating system 1) as an example. The participating system 110A includes a transaction execution unit 111, a database management unit 112, and a database 113. The other participating systems 110B, 110C, etc. can also have the same configuration as that of the participating system 110A.

Figure 2:
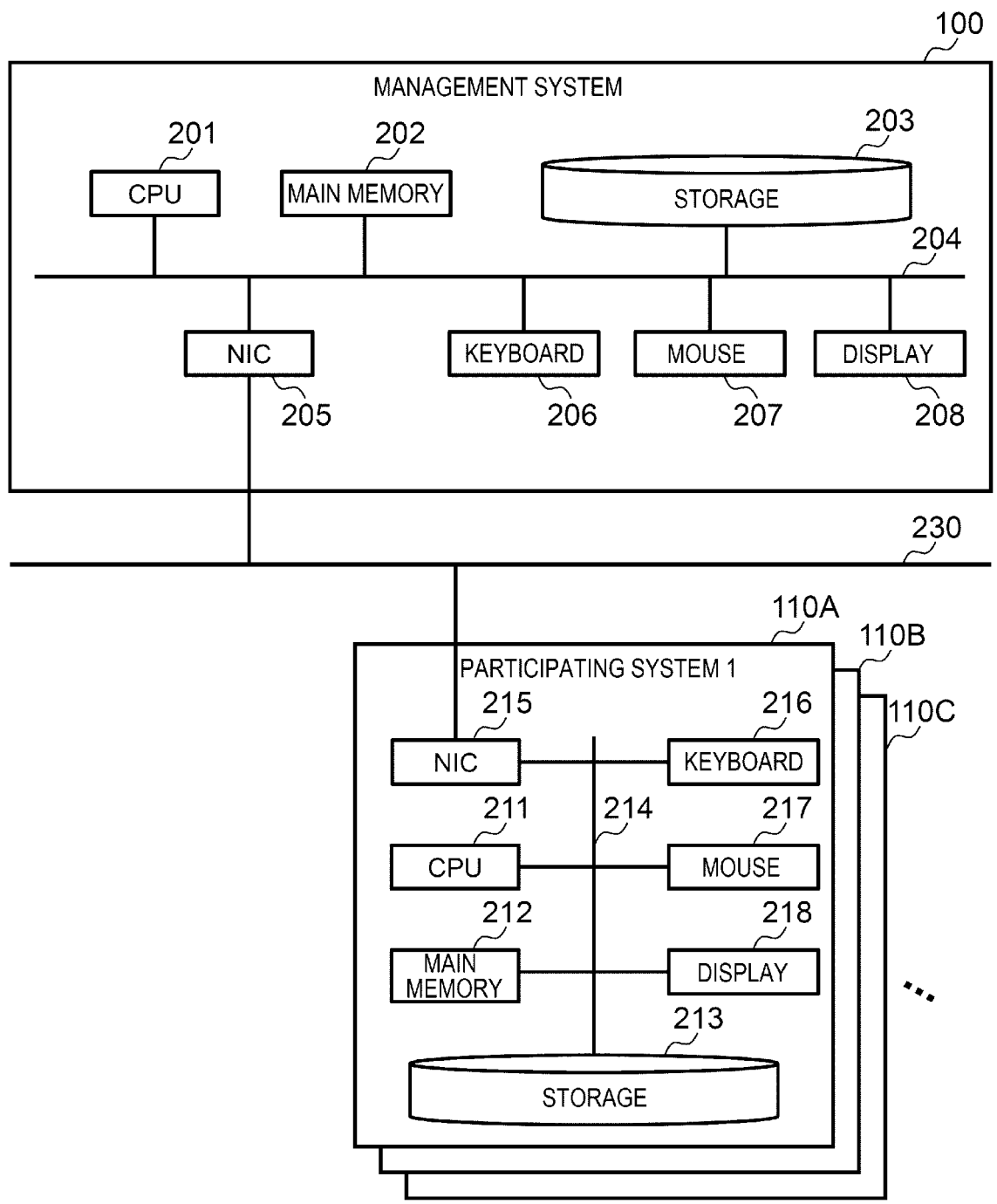
FIG. 2 is a diagram showing a hardware configuration according to the embodiment.

FIG. 2 is a block diagram showing a hardware configuration in the system 1. Hereinafter, the hardware configuration in the system 1 will be described with reference to FIG. 2.

Each of the management system 100 and the participating systems 110 can be realized by a general information processing device (computer) such as a server device, a personal computer, or a workstation. That is, as shown in FIG. 2, the hardware configuration of each system can include a CPU (201, 211) as an example of processor, a main memory (202, 212) as an example of memory, a storage (203, 213) as an example of persistent storage device, an NIC (205, 215) as an example of interface device, a keyboard (206, 216) and a mouse (207, 217) as an example of input device, a display (208, 218) as an example of output device, and a bus (204, 214) that connects the same. The systems (100 and 110) are connected to each other via a network 230. Each participating system 110 is communicably connected to the NIC 205 of the management system 100.

Hereinafter, the hardware configuration of each system (100, 110) will be described with the management system 100 as a representative example. Hardware components of the other systems (110) can be configured basically the same as those of the management system 100.

The CPU 201 controls the functional units included in the management system 100 by executing a program. Specifically, for example, the CPU 201 reads a necessary program into a main memory 202 and executes the program to realize the functional units.

The NIC 205 is an interface device for connection to the network 230.

The main memory 202 includes a volatile memory such as a normal random access memory (RAM), and stores the program executed by the CPU 201 and data to be referred to.

A storage 203 is a storage device that stores information, such as a hard disk drive (HDD) or a solid state drive (SSD).

The keyboard 206 and the mouse 207 are input devices for a user 300 to input data and commands.

The display 208 is configured with, for example, a liquid crystal display monitor, and is a display device that displays a necessary screen and a result of each processing.

In the present embodiment, unless otherwise specified, an input from the user 300 (see FIG. 3) to each system (100, 110) and display of information from the system (100, 110) to the user 300 are collectively performed by the keyboard (206, 216), the mouse (207, 217), and the display (208, 218).

Figure 3:
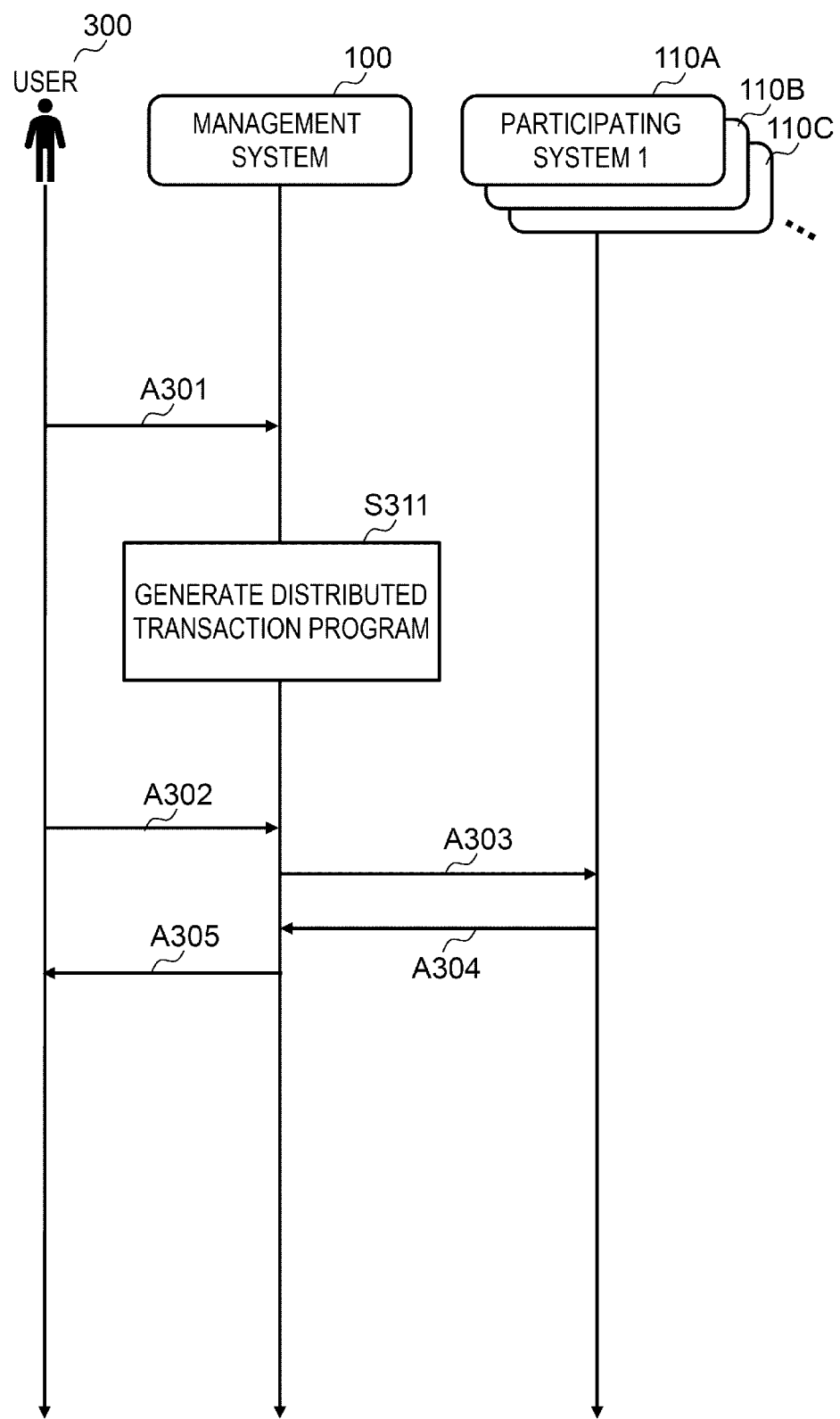
FIG. 3 is a sequence diagram showing a process related to a distributed transaction according to the embodiment.

FIG. 3 is a sequence diagram showing an outline of operations of the system 1. The system 1 is intended to be capable of maintaining the data consistency by executing a distributed transaction program applied with appropriate patterns without modifying implementation of the management system 100 even when a service characteristic of the participating system 110 changes, instead of or in addition to a distributed transaction flow. Hereinafter, the present embodiment will be described with reference to the sequence diagram in FIG. 3.

At an initial state of the present embodiment, a program necessary for the operations of each functional unit (101, 102, 103, 104, 105) is stored in the storage 203. The pattern program storage area 108 stores a pattern program table 401 shown in FIG. 4 and pattern programs associated with the pattern program table 401 (with a pattern program (Retry) 411 as an example). The pattern table storage area 106 stores a pattern table 501 shown in FIG. 5. The call program storage area 107 stores a call program table 601 of participating systems shown in FIG. 6 and call programs associated with the call program table 601 (with a call program 611, whose call target is a participating system 2, as an example). The pattern rule storage area 109 stores a pattern rule table 1401 shown in FIG. 14 and pattern rule programs associated with the pattern rule table 1401 (with a pattern rule program (rule001) 1411 as an example).

Figure 10:
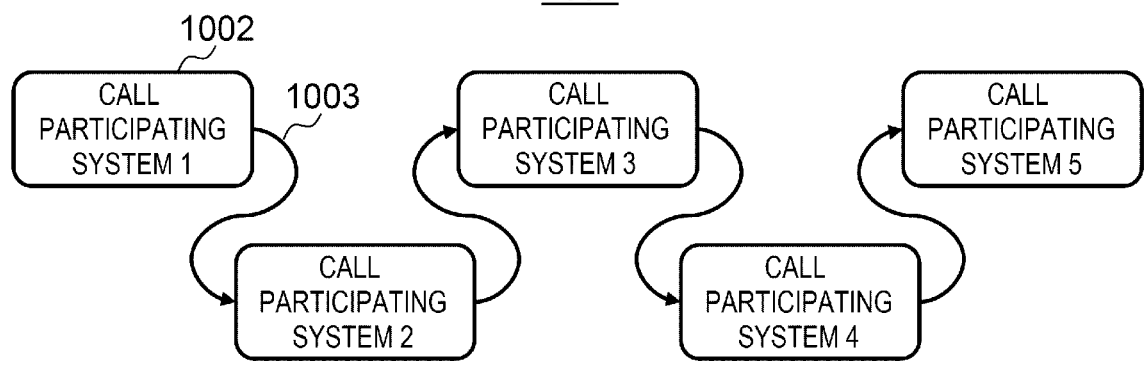
FIG. 10 is a diagram showing a distributed transaction flow according to the embodiment.

The user 300 uses, for example, a user terminal (an information processing terminal of the user 300) to input a service characteristic table 701 shown in FIG. 7 and a distributed transaction flow 1001 shown in FIG. 10 to the management system 100 as information A301 related to generation of a distributed transaction execution program. The input unit 51 of the management system 100 receives input of the flow 1001 and the table 701. The management system 100 generates a distributed transaction program corresponding to the distributed transaction flow 1001 based on such input (the flow 1001 and the table 701) by a processing described later (S311).

FIG. 7 is a diagram showing the service characteristic table 701.

The service characteristic table 701 includes a row for each participating system 110 and two columns including a "service" column 702 and a "service characteristic" column 703.

The "service" column 702 lists the participating systems 110 (e.g., names of the participating systems 110) to be called by the management system 100. The example shown in FIG. 7 lists five participating systems as a participating system.

The "service characteristic" column 703 lists a service characteristic of each participating system (e.g., a specification of the participating system and names of functions (e.g., implemented applications)). For example, the "participating system 1" has a service characteristic of "SAGA (asynchronous)". The "service characteristic" column 703 may list a characteristic of the management system 100 in addition to the service characteristics of the participating systems.

FIG. 10 is a diagram showing the distributed transaction flow 1001.

The distributed transaction flow 1001 is information (data) defining call sequential numbers of the plurality of participating systems 110 to be called in the distributed transaction executed in the system 1 (a call sequence of the participating systems). The present embodiment is described such that a total of five systems from the "participating system 1" to a "participating system 5" are called sequentially. The distributed transaction flow 1001 is represented by, for example, a directed acyclic graph (DAG). Nodes 1002 represent calling the participating systems 110, and edges (connection lines) 1003 represent the call sequence. The distributed transaction flow 1001 may be defined such that two or more participating systems 110 are called in parallel when one participating system 110 ends transaction execution, or may be defined such that one participating system 110 is called when two or more participating systems 110 each end transaction execution.

A distributed transaction program generation processing (S311 in FIG. 3) will be described with reference to FIG. 11. For the distributed transaction program to be generated, refer to FIG. 8 as appropriate.

Figure 11:
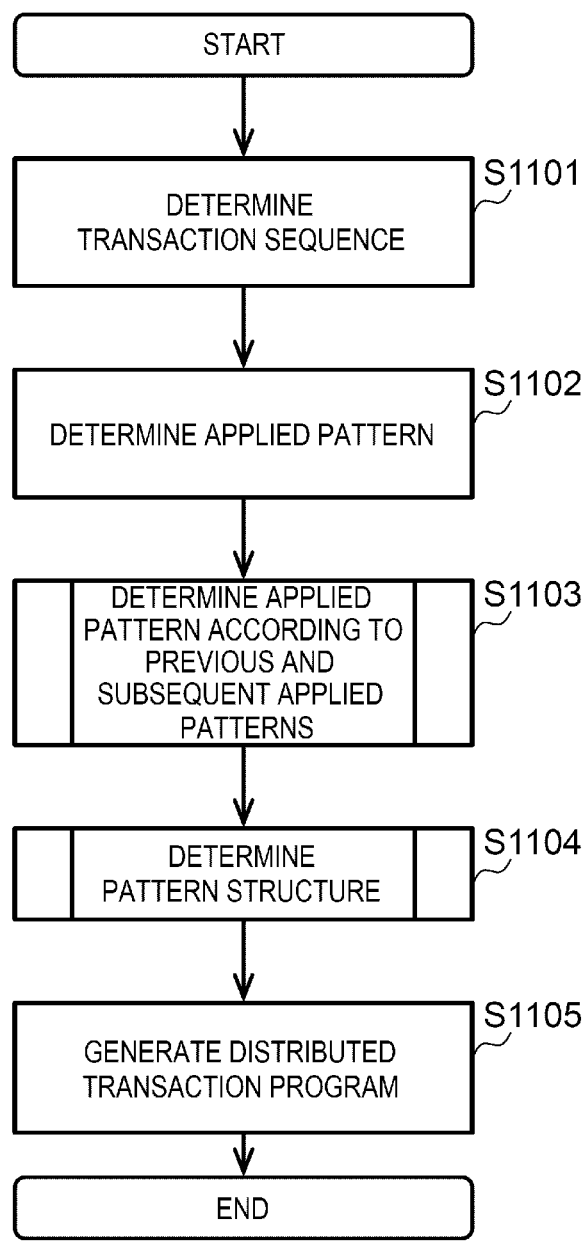
FIG. 11 is a flow diagram showing a distributed transaction program generation processing according to the embodiment.

FIG. 11 is a flow diagram showing the distributed transaction program generation processing (S311 in FIG. 3). Hereinafter, the distributed transaction program generation processing will be described with reference to this flow diagram.

Figure 8:
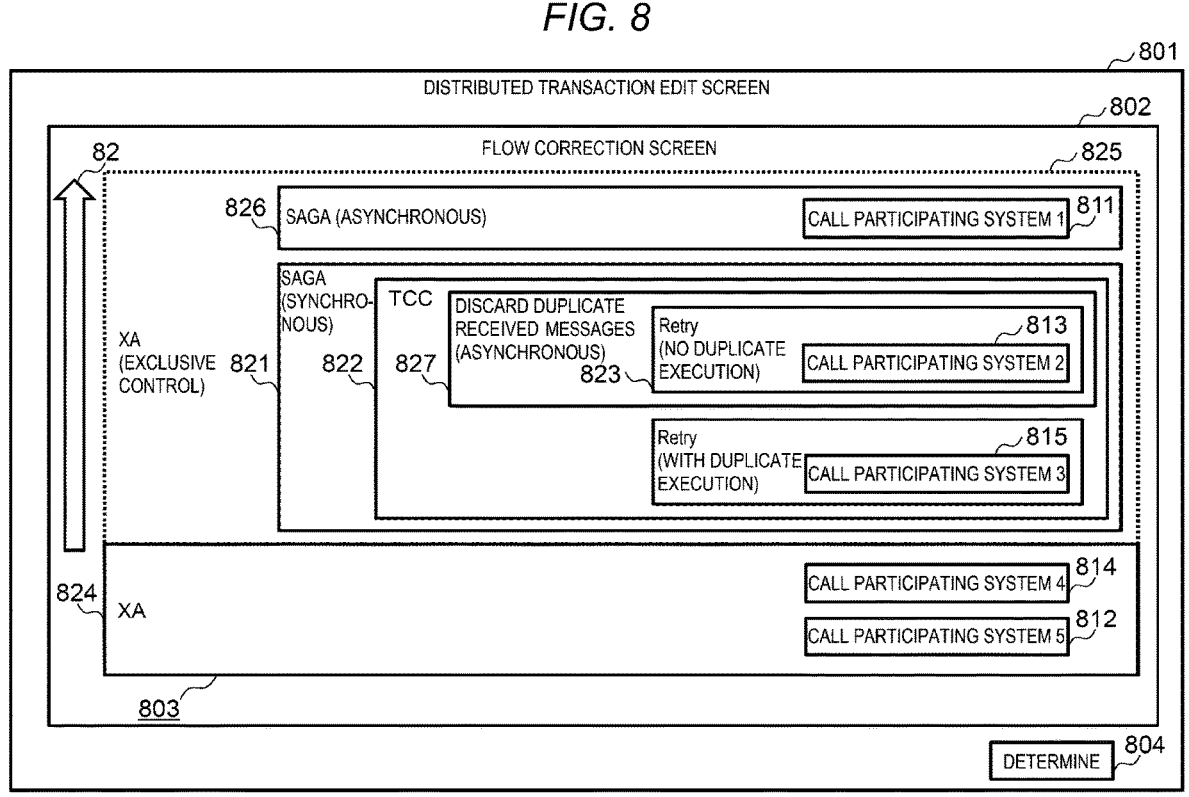
FIG. 8 is a diagram showing a distributed transaction edit screen according to the embodiment.

FIG. 8 is a diagram showing a distributed transaction edit screen 801 used by the user to edit a distributed transaction program 803 generated by the distributed transaction program generation processing. The distributed transaction edit screen 801 is provided by, for example, the distributed transaction program generation unit 104 of the management system 100. A description will be given with reference to the distributed transaction program 803 displayed on a flow correction screen 802 in the edit screen 801 as appropriate.

In S1101, the distributed transaction program generation unit 104 of the management system 100 refers to the distributed transaction flow 1001 and determines a sequence of transactions. Specifically, the distributed transaction program generation unit 104 refers to the distributed transaction flow 1001 shown in FIG. 10, reads that systems are to be called sequentially from the participating system 1 to the participating system 5 by tracing calls of the participating systems 110 (nodes 1002) along the edges (connection lines) 1003, and confirms a system call sequence from "call participating system 1" 811 to "call participating system 5" 812 in FIG. 8. The distributed transaction program 803 displayed on the flow correction screen 802 is executed from a top to a bottom of the screen (from the "call participating system 1" 811 to the "call participating system 5" 812) during execution.

In S1102, the applied pattern determination unit 101 of the management system 100 refers to the service characteristic table 701 and the pattern table 501, and determines an applied pattern for generation of the distributed transaction program 803. This processing will be described with reference to the service characteristic table 701 and the pattern table 501.

FIG. 5 is a diagram showing the pattern table 501. In the present embodiment, the pattern table 501 includes a row for each pattern (typically, a name of patterned processing logic), and includes seven columns including a "pattern" column 511, a "dependent pattern (previous)" column 512, a "dependent pattern (subsequent)" column 513, a "dependent pattern (hierarchy)" column 514, a "call source restriction" column 515, a "call target restriction" column 516, and an "option" column 517. For example, the "pattern" column 511, the "dependent pattern (previous)" column 512, the "dependent pattern (subsequent)" column 513, and the "dependent pattern (hierarchy)" column 514 list names of patterns respectively. Methods for using the columns will be appropriately described in the following description of processing.

In processing of S1102, the applied pattern determination unit 101 of the management system 100 refers to the service characteristic table 701 and the pattern table 501, and specifies a pattern applicable to each system call (e.g., the "call participating system 1" 811) in the distributed transaction program 803. Further, the distributed transaction program generation unit 104 receives information representing the pattern specified by the applied pattern determination unit 101 from the applied pattern determination unit 101, and applies the pattern. This processing will be exemplified by applying the pattern to a call 813 whose call target is the participating system 2.

The applied pattern determination unit 101 of the management system 100 refers to the service characteristic table 701 and reads that the participating system 2 has three service characteristics including "SAGA (synchronous)", "TCC", and "idempotence (prevent duplicate execution)". Subsequently, the applied pattern determination unit 101 of the management system 100 refers to the "call target restriction" column 516 of the pattern table 501, and specifies patterns "SAGA (synchronous)", "TCC", and "Retry (no duplicate execution)" corresponding to (matching with) the read service characteristics "SAGA (synchronous)", "TCC", and "idempotence (prevent duplicate execution)" respectively. The "call target restriction" means a constraint condition which is a requirement of a service characteristic of a participating system as a call target. The pattern "SAGA (synchronous)" is a pattern in which a distributed transaction is realized by sequential execution of local transactions of participating systems. The pattern "TCC" is a pattern for performing a system call in accordance with application programming interfaces (APIs) corresponding to three types of instructions including try, confirm, and cancel. The pattern "Retry (no duplicate execution)" is a pattern in which retry is performed without considering the idempotence in a system call. Other patterns listed in the pattern table 501 are also patterns that contribute to the data consistency according to the service characteristics as described above. The "call source restriction" column 515 lists the service characteristics that the management system 100 should have when each pattern is to be applied. The management system 100 has all the characteristics in the "call source restriction" column 515 in the present embodiment. Therefore, the management system 100 can apply all the patterns listed in the pattern table 501 to the call of each participating system as long as other conditions other than the call source restriction (the call target restriction and dependent patterns to be described later) are satisfied (in other words, the "call source restriction" column 515 is unnecessary as long as, e.g., the management system 100 has all the characteristics of the "call source restriction" column 515). The service characteristics of the management system 100 may be included in the service characteristic table 701 depending on the embodiment. When the management system 100 does not have service characteristics, the patterns may be not listed in the pattern table 501. "–" in the "call target restriction" column 516 is a special symbol indicating that application is possible regardless of specific service characteristics. Therefore, candidates of patterns to be applied include not only the patterns of "SAGA (synchronous)", "TCC", and "Retry (no duplicate execution)", but also "XA (exclusive control)", "discard duplicate received message (synchronous)", and "discard duplicate received message (asynchronous)". However, these patterns are not applied in S1102, because these patterns have already been listed in the "dependent pattern (previous)" and the "dependent pattern (subsequent)" indicating patterns to be applied to previous and subsequent participating systems for applying these patterns (i.e., in order to apply these patterns, some patterns need to be already applied to the distributed transaction program).

The applied pattern determination unit 101 of the management system 100 refers to the "dependent pattern (hierarchy)" column 514 for the specified patterns including "SAGA (synchronous)", "TCC", and "Retry (no duplicate execution)", and determines structures of applied patterns such that inconsistency does not occur in a dependency relationship thereof. Specifically, for example, the applied pattern determination unit 101 of the management system 100 refers to a row of "SAGA (synchronous)", confirms that there is no dependent pattern ("–" in the "dependent pattern (hierarchy)" column 514 is a special symbol indicating that the pattern can be applied without depending on any pattern), and determines to apply the pattern "SAGA (synchronous)" to the participating system 2. Next, the applied pattern determination unit 101 of the management system 100 refers to a row of "TCC", specifies that the dependent pattern is "SAGA (synchronous)", and determines to apply "TCC" to the participating system 2 as an applied pattern subordinate to "SAGA (synchronous)". Finally, the applied pattern determination unit 101 of the management system 100 refers to a row of "Retry (no duplicate execution)" and specifies that the dependent patterns are "SAGA (synchronous)", "SAGA (asynchronous)", and "TCC". In the present embodiment, when a plurality of dependent patterns are present, a pattern can be applied as long as any one or more of the dependent patterns are applied. However, when a plurality of patterns are applied, the patterns must be applied without any inconsistency occurring in a hierarchical relationship among these patterns. Therefore, in the present embodiment, it is determined that "Retry (no duplicate execution)" is applied as an applied pattern subordinate to "TCC". When a pattern is listed in the "dependent pattern (hierarchy)" while the listed pattern is not applied, a pattern of this row cannot be applied. For example, "TCC" cannot be applied when the "SAGA (synchronous)" pattern is not applied.

By executing the processing described in the pattern application to the "call participating system 2" 813 to the other participating systems as well, in the distributed transaction program 803 showed in FIG. 8, generation of the distributed transaction program 803 is determined such that "XA (exclusive control)" and "discard duplicate received message (asynchronous)" are excluded, that is, the patterns of "XA", "SAGA (asynchronous)", "SAGA (synchronous)", "TCC", "discard duplicate received message (asynchronous)", "Retry (no duplicate execution)", and "Retry (with duplicate execution)" are appropriately applied to the respective participating system call programs.

In S1103, the applied pattern determination unit 101 of the management system 100 further refers to the pattern table 501 and determines a pattern to be further applied according to previous and subsequent applied patterns. A processing of S1103 will be described with reference to FIG. 12.

Figure 12:
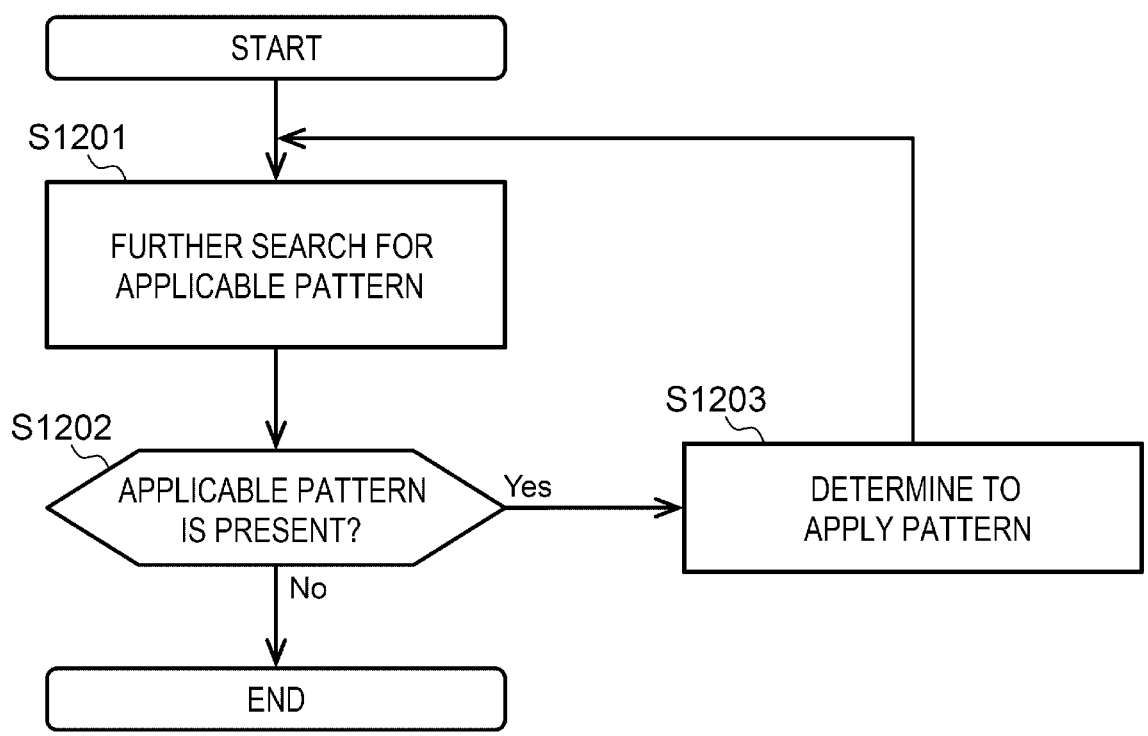
FIG. 12 is a flow diagram showing S1103 in FIG. 11.

FIG. 12 is a flow diagram showing S1103 (search for applied patterns to be further executed and execute application processing by the management system 100) in FIG. 11.

In S1201, the applied pattern determination unit 101 of the management system 100 scans the distributed transaction program 803, acquires patterns applied to call programs previous and subsequent to the call program of each participating system (e.g., the "call participating system 2" 813), and further refers to the pattern table 501 to determine the patterns applicable to the call of the participating system according to the previous and subsequent applied patterns. The pattern applied in the processing of S1201 will be described by taking the "call participating system 2" 813 as an example. For example, as shown in FIG. 8, patterns including "SAGA (synchronous)" 821, "TCC" 822, and "Retry (no duplicate execution)" 823 have already been applied to the "call participating system 2" 813. As described in S1102, "XA (exclusive control)", "discard duplicate received message (synchronous)", and "discard duplicate received message (asynchronous)" are extracted as candidate applied patterns.

In S1202, the applied pattern determination unit 101 of the management system 100 determines whether a pattern is applicable, that is, refers to the "dependent pattern (previous)" column 512 and the "dependent pattern (subsequent)" column 513 in the pattern table 501 among the patterns extracted in S1201 and determine whether the extracted patterns are applicable. A processing of S1202 will be described by taking "call participating system 3" 815 as an example. Since "XA" 824 is applied to "call participating system 4" 814 ("call participating system 4", which has a sequential number immediately subsequent to "call participating system 3"), the applied pattern determination unit 101 determines that "XA (exclusive control)", which corresponds to the row including "XA" listed in the "dependent pattern (subsequent)" column 513 of the pattern table 501, can be applied to "call participating system 3" 815 (a loop processing after S1203 finally determines that "XA (exclusive control)" is also applicable to "call participating system 1" 811 and "call participating system 2" 813). Further, the applied pattern determination unit 101 refers to "SAGA (asynchronous)" 826 applied to the "call participating system 1" 811 ("call participating system 1", which has a sequential number immediately previous to "call participating system 2"), and determines that "discard duplicate received message (asynchronous) 827" corresponding to a row including "SAGA (asynchronous)" listed in the "dependent pattern (previous)" column 513 of the pattern table 501 can be applied to the "call participating system 2" 813.

The applied pattern determination unit 101 reads that "XA (exclusive control)" in the pattern table 501 is "Yes" in the "option" column 517, which indicates that application is optional, and determines to apply the pattern and determines that the application is optional. The pattern "XA (exclusive control)" is a pattern in which lock related to reading and writing of data, which is called exclusive control, is performed in advance on a database of a participating system to be applied with the "XA" pattern in the "dependent pattern (subsequent)" column 513. As a result, when a distributed transaction of a participating system applied with "XA (exclusive control)" is to be executed, rewriting of data related to the distributed transaction of the participating system applied with "XA" can be prevented. For example, a pattern whose option is "Yes" may be applied when the number of applicable patterns is less than a certain number (in other words, may be not applied when the number of applicable patterns is equal to or greater than a certain number).

If one or more patterns are applicable, the applied pattern determination unit 101 advances the processing to S1203. If no patterns are applicable, the applied pattern determination unit 101 ends the flow.

In S1203, the applied pattern determination unit 101 of the management system 100 determines to apply the patterns determined as applicable in S1202 to the distributed transaction program 803, determines to optionally apply the patterns considered to be applied optionally, and advances the processing to the next S1201.

S1201, S1202, and S1203 are repeated until no patterns are applicable.

Figure 13:
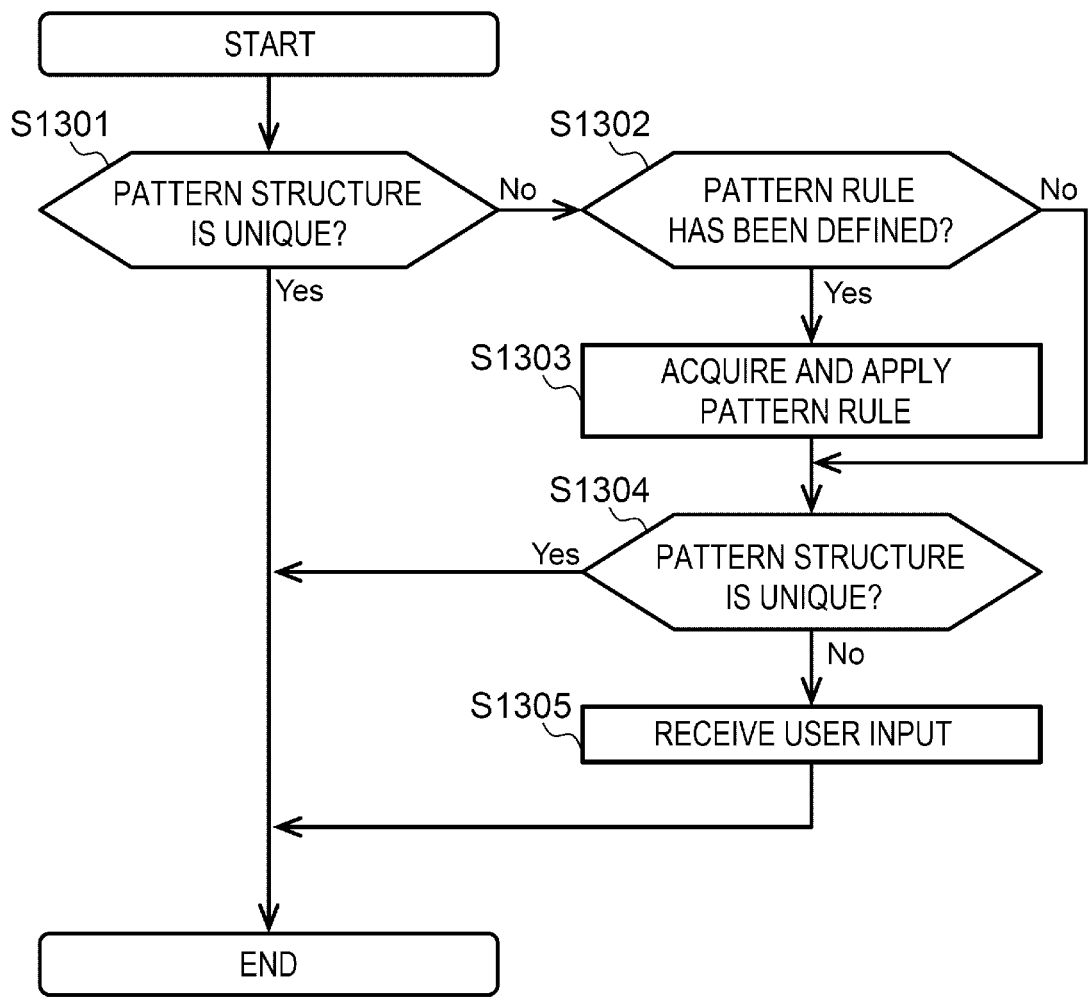
FIG. 13 is a flow diagram showing S1104 in FIG. 11.

In S1104 of FIG. 11, the distributed transaction program generation unit 104 of the management system 100 determines a pattern structure of the distributed transaction program 803. A processing of S1104 will be described with reference to FIG. 13. FIG. 13 is a flow diagram showing S1104 (pattern structure determination processing) in FIG. 11.

In S1301, the distributed transaction program generation unit 104 of the management system 100 determines whether the pattern structure is unique. In the present embodiment, application of "XA (exclusive control)" 825 is optional and is not uniquely determined, and thus the processing proceeds to S1302.

In S1302, the distributed transaction program generation unit 104 of the management system 100 checks whether a pattern rule related to the pattern structure has been defined. This processing will be described with reference to FIG. 14.

Figure 14:
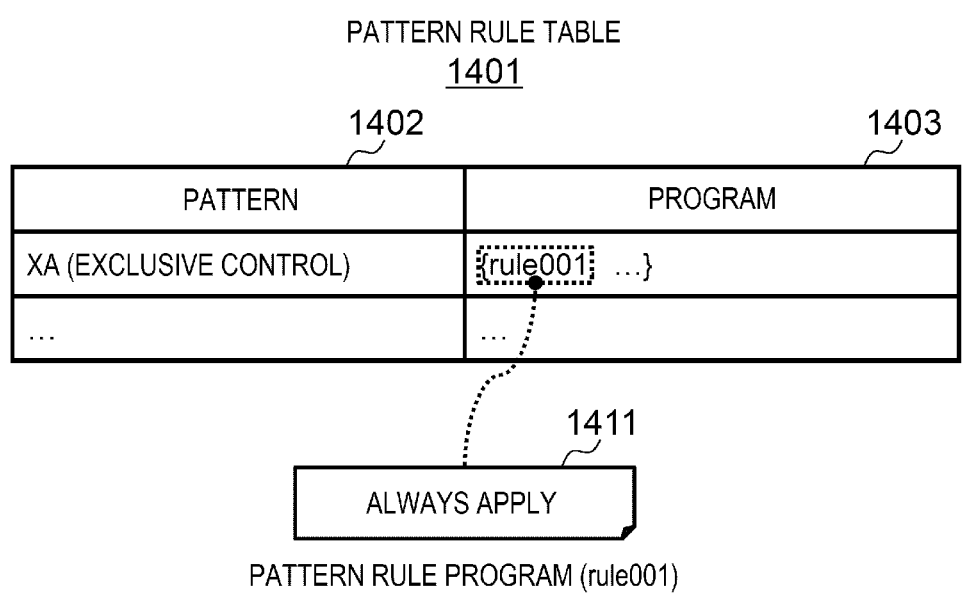
FIG. 14 is a diagram showing a pattern rule table and pattern rule programs according to the present embodiment.

FIG. 14 shows a pattern rule managed by the management system 100. The pattern rule is managed by the pattern management unit 102 of the management system 100, and includes the pattern rule table 1401 and pattern rule programs (with the pattern rule program (rule001) 1411 as an example) managed in association with the pattern rule table 1401. The pattern rule table 1401 includes a row for each pattern as optional application, and includes a "pattern" column 1402 and a "program" column 1403. In the present embodiment, for the "XA (exclusive control)" 825 whose application is not uniquely determined, "XA (exclusive control)" is present in the "pattern" column 1402, "rule001" is present in the "program" column 1403, and a pattern rule program (rule001) 1411 corresponding to "rule001" is defined (associated) with "rule001". Therefore, it is regarded that a pattern rule is defined for the "XA (exclusive control)" 825. In this case, the processing proceeds to S1303.

In S1303, the distributed transaction program generation unit 104 of the management system 100 acquires and applies the pattern rule from the pattern management unit 102. According to an example with reference to FIG. 14, the pattern rule "rule001" corresponding to "XA (exclusive control)" is acquired and applied. The pattern rule program (rule001) 1411 as "always apply" is managed in association with the pattern rule "rule001", and the pattern is applied to all applicable system calls. Therefore, in the present embodiment, the pattern ("XA (exclusive control)" 825) is applied to the "call participating system 1" 811, the "call participating system 2" 813, and the "call participating system 3" 815 (see FIG. 8).

In S1304, the distributed transaction program generation unit 104 of the management system 100 determines whether the pattern structure is unique. If the pattern structure is unique, the processing is ended, and if not unique, the processing proceeds to S1305. In the present embodiment, since all the patterns are uniquely determined by the pattern rule of FIG. 14, the processing is ended.

A processing in which no pattern rules as shown in FIG. 14 are defined and the processing proceeds to S1305 will be described with reference to FIG. 8.

The distributed transaction edit screen 801 showed in FIG. 8 is a screen used by the user 300 to edit a distributed transaction and uniquely determine a pattern structure when the pattern structure is not uniquely determined. The distributed transaction edit screen 801 includes the flow correction screen 802 and a determination button 804. The user 300 can check an application range of the "XA (exclusive control)" 825 for which the pattern structure is not uniquely determined on the flow correction screen 802 while operating the mouse 207 to determine an application range of the pattern in a range of an arrow 82. After the edit is completed, the user 300 clicks the determination button 804 using the mouse 207 to confirm an edit result. These operations by the user 300 are input to the distributed transaction program generation unit 104 and reflected in the distributed transaction program 803 as a processing result of S1305.

In S1105, the distributed transaction program generation unit 104 of the management system 100 applies the pattern determined to be applied by S1101 to S1104 of FIG. 11 to the system call program (811, 812, 813, 814, 815) of each participating system, and generates the distributed transaction program 803 to be executed.

Application of the pattern program to the call program (811, 812, 813, 814, 815) of each participating system will be described with reference to FIGS. 4, 6, and 9.

Figure 4:
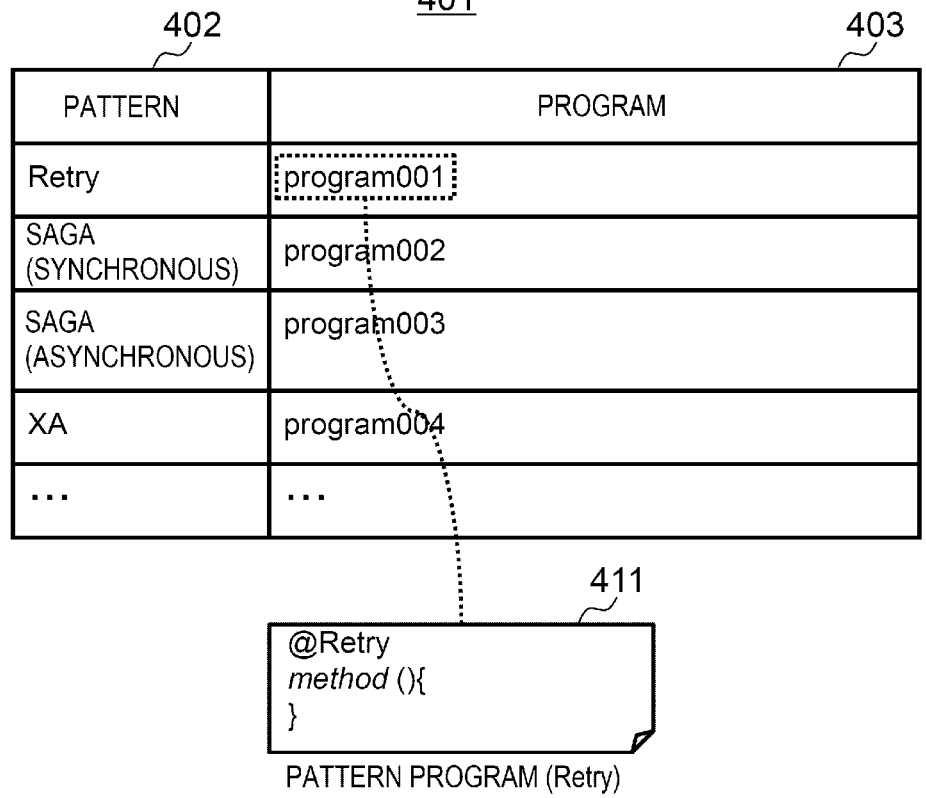
FIG. 4 is a diagram showing a pattern program table and a pattern program according to the embodiment.

FIG. 4 is a diagram showing the pattern program table 401 managed by the pattern management unit 102 of the management system 100 and the pattern programs (with the pattern program (Retry) 411 as an example) managed in association with the table. The pattern program table 401 includes a row for each pattern program, and includes two columns including a "pattern" column 402 and a "program" column 403. The "pattern" column 402 lists a list of patterns (e.g., names of patterns) including patterns whose applicability is determined by the applied pattern determination unit 101. The "program" column 403 manages IDs of programs corresponding to the patterns defined in the "pattern" column 402. The pattern program (Retry) 411 is an example of the pattern program corresponding to the "Retry" pattern. "Pattern program" is a program that describes a pattern of processing (typically, patterned processing logic).

Figure 6:
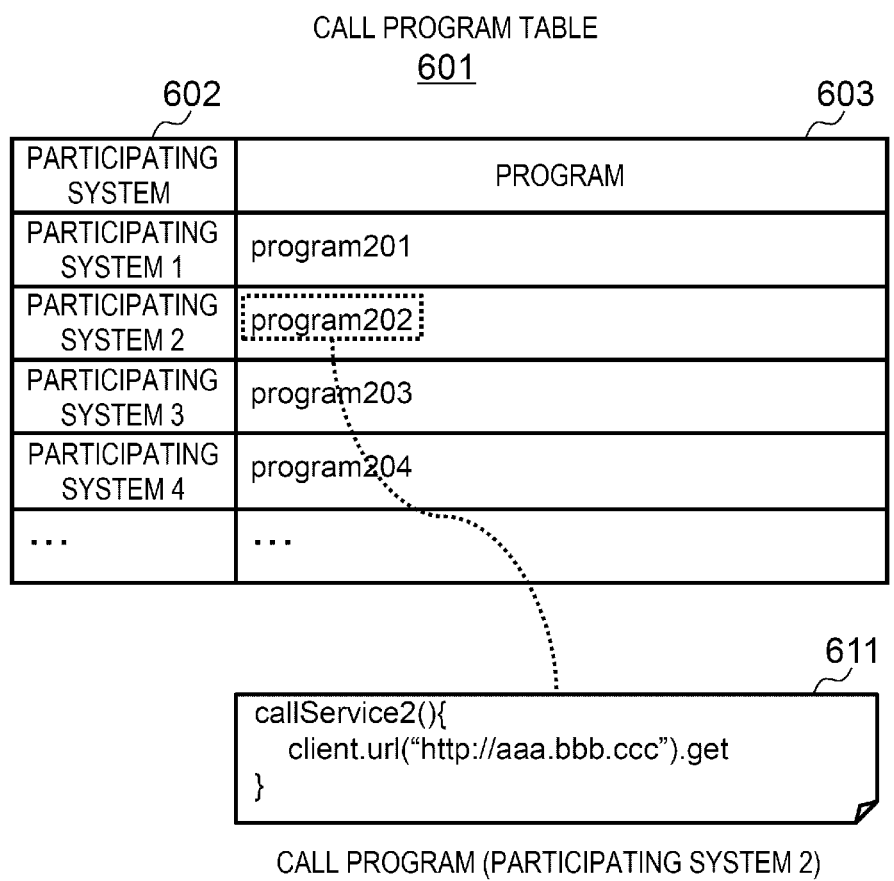
FIG. 6 is a diagram showing a call program table and call programs according to the embodiment.

FIG. 6 is a diagram showing the call program table 601, which manages the call programs of each participating system managed by the call program management unit 103 of the management system 100, and the call programs (with the call program (participating system 2) 611 as an example) managed in association with the table. The call program table 601 includes a row for each participating system (each call program), and includes two columns including a "participating system" column 602 and a "program" column 603. The "participating system" column 602 lists the participating systems (e.g., names of the participating systems) called by the distributed transaction. The "program" column 603 lists an ID of the call program corresponding to each participating system. The call program (participating system 2) 611 is an example of a call program corresponding to the call program of the participating system 2.

Figure 9:
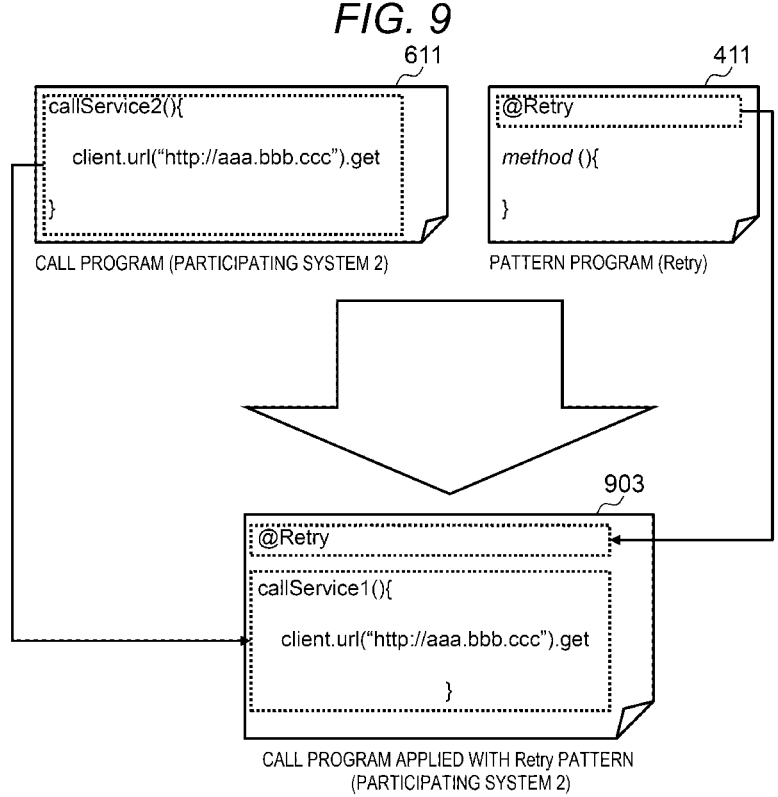
FIG. 9 is a diagram showing generation of a pattern-applied participating system call program according to the embodiment.

FIG. 9 is a diagram showing an example in which a pattern is applied to a call program.

In S1105 of FIG. 11, the distributed transaction program generation unit 104 of the management system 100 receives a determination result related to the applied pattern from the applied pattern determination unit 101. The distributed transaction program generation unit 104 acquires a pattern program corresponding to the applied pattern (the pattern program (Retry) 411 as for the example of FIG. 9) from the pattern management unit 102, and acquires a program corresponding to each system call (the call program (participating system 2) 611 as for the example of FIG. 9) from the call program management unit 103. The distributed transaction program generation unit 104 applies (e.g., embeds) the call program to the pattern program corresponding to the pattern applied to the participating system corresponding to the acquired call program, thereby generating a pattern-applied call program (a call program 903 for the participating system 2 applied with Retry pattern as for the example of FIG. 9).

Generation of the pattern-applied call program will be exemplified by applying the pattern program (Retry) 411 to the call program 611 for the participating system 2. First, in the pattern program (Retry) 411, an annotation "@Retry" and a "method( )" inserted with a call program are defined as a function. The annotation is one of specifications adopted in a plurality of programming languages, and indicates that a processing or a feature described in the annotation is further added to the function. The distributed transaction program generation unit 104 inserts the call program (participating system 2) 611 into a function part defined by "method( )" of the pattern program (Retry) 411, and thus the program 903 for the participating system 2 applied with Retry pattern call can be generated. Description of the pattern programs and the participating system call program and generation of the pattern-applied participating system call program can be performed using appropriate description and method according to the embodiment. For example, XA, which is a standard specification in the distributed transaction, and implementation related to this specification may be used.

In S1105 of FIG. 11, the pattern-applied call program is generated for each participating system participating in the distributed transaction (for each participating system specified from the distributed transaction flow 1001 or the service characteristic information 701). The distributed transaction program 803 including the pattern-applied call programs to be executed in an order (call order) of participating systems represented by the distributed transaction flow 1001 is generated based on the pattern-applied call programs for the participating systems and the order of the participating systems.

The distributed transaction program 803 is generated by a series of flows described above in FIG. 11, and S311 in FIG. 3 is ended.

An operation (A302), a transaction request A303, a transaction result A304, and a response (A305) to the result related to the distributed transaction will be described with reference to FIG. 3.

In the present embodiment, the user 300 can execute the distributed transaction by requesting the management system 100 to execute the distributed transaction program 803 generated in the management system 100 as the operation A302 related to the distributed transaction. The distributed transaction execution unit 105 of the management system 100 receives a request from the user 300, and issues the transaction request A303 in a sequence for a plurality of (or one) participating systems 110 related to the distributed transaction so as to execute the distributed transaction program 803. Each participating system, for example, the participating system 1 receives the transaction request A303 from the management system 100, executes a transaction in the participating system 1 by cooperation of the transaction execution unit 111, the database management unit 112, and the database 113, and returns a result to the management system 100 as the transaction result A304. According to the embodiment, transaction in each participating system may be based on, for example, the specification represented by XA, or may be realized by executing SAGA according to a specific protocol or an API provided by the participating system.

The user 300 receives the response (A305) to the result of the operation related to the distributed transaction from the management system 100, and ends the series of processing related to the distributed transaction.

Thus, according to the information processing system 1 of the present embodiment, it is possible to reduce the amount of working hours required for maintaining the data consistency by combining appropriate patterns without modifying the implementation of the distributed transaction management system 100 even in an environment incapable of giving a distributed transaction flow and service characteristics of participating systems.

The above description can be summarized, for example, as follows. The following summary may include supplements to the description of the embodiment described above or modifications of the embodiment.

The distributed transaction management unit includes the input unit 51, the applied pattern determination unit 101, and the distributed transaction program generation unit 104. The input unit 51 receives input of the distributed transaction flow 1001 and the service characteristic table 701. The distributed transaction flow 1001 is information defining respective call sequential numbers of the plurality of participating systems 110 to be called in the distributed transaction. The plurality of participating systems 110 are each a system participating in the distributed transaction. The service characteristic table 701 is a table representing service characteristics as respective characteristics of the plurality of participating systems 110. The applied pattern determination unit 101 specifies an applied pattern for each of the participating systems 110 represented by the service characteristic table 701, based on the pattern table 501 including information for each pattern that represents the constraint condition of the service characteristic of the participating system 110 as a call target. The applied pattern is a pattern satisfying the constraint condition corresponding to the service characteristic of the participating system 110. The distributed transaction program generation unit 104 generates the pattern-applied call program for each of the plurality of participating systems 110, and generates the distributed transaction program 803 based on the pattern-applied call programs for the plurality of participating systems 110 and the call sequence represented by the distributed transaction flow 1001. The distributed transaction program 803 includes the plurality of pattern-applied call programs to be executed in the call sequence. The pattern-applied call program for each of the plurality of participating systems 110 is a program obtained by applying the pattern program to the call program whose call target is the participating system 110. The pattern program is a pattern program of the applied pattern specified for the participating system 110 among the plurality of pattern programs listed for the respective patterns.

As a result, even when a service characteristic of a participating system 110 changes, since the changed service characteristic is listed in the input service characteristic table 701, a pattern suitable for the changed service characteristic is specified for the participating system 110, a pattern-applied call program obtained by applying the pattern program of the pattern to the call program is automatically generated, and the distributed transaction program 803 including the pattern-applied call program is automatically generated. As a result, the distributed transaction in which appropriate patterns are combined can be executed without modifying the implementation of the management system.

The distributed transaction management system 100 may include the distributed transaction execution unit 105 that executes the distributed transaction program 803. Thus, the distributed transaction management system 100 can execute the distributed transaction program 803 after the distributed transaction program 803 is generated.

The pattern table 501 may include information for each pattern that represents the dependency relationship between the patterns. The dependency relationship between patterns may be a hierarchical relationship of patterns or a relationship between previous and subsequent (e.g., immediately previous or immediately subsequent) patterns. The applied pattern determination unit 101 may specify the applied pattern for each of the participating systems 110 represented by the service characteristic table 701 based on the information representing the dependency relationship between the patterns corresponding to the participating system 110, in addition to the information representing the constraint condition corresponding to the service characteristic of the participating system 110. As a result, an appropriate pattern that is not inconsistent with the dependency relationship between the patterns can be specified as the applied pattern.

The information for each pattern that represents the dependency relationship between the patterns may include the dependent pattern (hierarchy) which is information representing the hierarchical relationship of the patterns. The applied pattern determination unit 101 may specify the applied pattern for each of the participating systems 110 represented by the service characteristic table 701, such that the applied pattern is a pattern satisfying the constraint condition corresponding to the service characteristic of the participating system 110, and that an applied pattern already specified for the participating system 110 has a hierarchy satisfying a hierarchy represented by the dependent pattern (hierarchy) corresponding to the participating system. As a result, an appropriate pattern that is not inconsistent with the hierarchical relationship of the patterns can be specified as the applied pattern.

The information representing the dependency relationship between patterns may include at least one of the following (a) and (b) for each pattern:

(a) the dependent pattern (previous) which is information representing the applied pattern for the participating system 110 having the call sequential number immediately previous to the call sequential number of the participating system 110 whose applied pattern is the pattern; and (b) the dependent pattern (subsequent) which is information representing the applied pattern for the participating system 110 having the call sequential number immediately subsequent to the call sequential number of the participating system 110 whose applied pattern is the pattern.

The applied pattern determination unit 101 may specify the applied pattern for each of the participating systems 110 represented by the service characteristic table 701, such that the applied pattern is a pattern satisfying the constraint condition corresponding to the service characteristic of the participating system 110 and satisfying at least one of the following (A) and (B). As a result, it is possible to specify an appropriate pattern that is not inconsistent with the pattern applied to the participating system 110 having the immediately previous or immediately subsequent call sequential number as the applied pattern.

(A) The applied pattern for the participating system 110 having the call sequential number immediately previous to the call sequential number of the participating system 110 corresponds to the applied pattern represented by the dependent pattern (previous) corresponding to the participating system 110; and (B) The applied pattern for the participating system 110 having the call sequential number immediately subsequent to the call sequential number of the participating system 110 corresponds to the applied pattern represented by the dependent pattern (subsequent) corresponding to the participating system 110.

When the structure of the distributed transaction program 803 is not uniquely determined, the distributed transaction program generation unit 104 may determine the structure of the distributed transaction program 803 based on the predetermined rule or user input. As a result, the structure of the distributed transaction program 803 can be appropriately determined. For example, when the structure of the distributed transaction program 803 is not uniquely determined, the distributed transaction program generator 104 may determine the structure of the distributed transaction program 803 based on the predetermined rule, and if the structure thereof is not uniquely determined even based on the predetermined rule, may uniquely determine the structure of the distributed transaction program 803 based on user input.

The pattern table 501 may include information for each pattern that represents whether application of the pattern is optional. The structure of the distributed transaction program 803 being not uniquely determined may mean that at least one optionally applied pattern is specified. In this manner, the rule or user input as described above can be used to solve a problem that the structure of the distributed transaction program 803 is not uniquely determined due to optional application of the patterns.

When at least one pattern whose application is optional is associated with a pattern rule program for a processing that follows a rule related to application of the pattern, when the specified applied pattern includes an applied pattern whose application is optional and when the applied pattern is associated with a pattern rule program, the distributed transaction program generation unit 104 may execute the pattern rule program in order to uniquely determine the structure of the distributed transaction program 803. Thus, when the structure of the distributed transaction program 803 is not uniquely determined, it can be expected that the structure of the distributed transaction program 803 is uniquely determined automatically by using the corresponding rule program.

One embodiment has been described above, which, however, is an example for describing the invention and is not intended to limit the scope of the invention only to the embodiment. The invention can be performed in various other forms.

For example, in FIG. 11, S1105 may be performed after S1102 without S1103 and S1104 (e.g., when the applied pattern is always uniquely determined (e.g., when the "option" column 517 is not present)). In addition, for example, among S1103 and S1104 of FIG. 11, S1104 may be present without S1103.

What is claimed is:

1. A distributed transaction management system comprising:
   a network interface card (NIC) coupled to communicate with participating systems;
   a memory configured to store a program and a pattern program table including pattern program identifiers;
   a processor coupled to the memory, the processor configured by the stored program to:
      receive via the NIC, a distributed transaction flow comprising information defining respective call sequential numbers of a plurality of the participating systems to be called in a distributed transaction, and service characteristic information representing service characteristics as respective characteristics of the plurality of participating systems;
      specify an applied pattern for each of the participating systems represented by the received service characteristic information, based on pattern information including information for each pattern that represents a constraint condition of a service characteristic of a participating system as a call target, wherein the applied pattern is a pattern satisfying the constraint condition corresponding to the received service characteristic of the participating system; and
      generate a distributed transaction program based on the pattern-applied call programs for the plurality of participating systems and a call sequence represented by the distributed transaction flow, wherein the generated distributed transaction program includes a plurality of pattern-applied call programs to be executed in the call sequence, wherein the pattern-applied call program for each of the plurality of participating systems is a program obtained by the processor configured by the program to apply a pattern program to a call program whose call target is the participating system, wherein the pattern program is a pattern program of the applied pattern specified by the processor for the participating system among a plurality of pattern programs listed in the pattern program table for the respective patterns.

2. The distributed transaction management system according to claim 1, further comprising:
   a distributed transaction execution unit that executes the distributed transaction program.

3. The distributed transaction management system according to claim 1, wherein
   the pattern information includes information for each pattern that represents a dependency relationship between the patterns, and
   the applied pattern determination unit specifies the applied pattern for each of the participating systems represented by the service characteristic information based on the information representing the dependency relationship between the patterns corresponding to the participating system, in addition to the information representing the constraint condition corresponding to the service characteristic of the participating system.

4. The distributed transaction management system according to claim 3, wherein the information for each pattern that represents the dependency relationship between the patterns includes a dependent pattern (hierarchy) which is information representing a hierarchical relationship of the patterns, and the applied pattern determination unit specifies the applied pattern for each of the participating systems represented by a service characteristic table, such that the applied pattern is a pattern satisfying the constraint condition corresponding to the service characteristic of the participating system, and that an applied pattern already specified for the participating system has a hierarchy satisfying a hierarchy represented by the dependent pattern (hierarchy) corresponding to the participating system.

5. The distributed transaction management system according to claim 3, wherein the information representing the dependency relationship between the patterns includes at least one of (a) and (b) as follows for each pattern:
   (a) a dependent pattern (previous) which is information representing an applied pattern for a participating system having a call sequential number immediately previous to a call sequential number of the participating system whose applied pattern is the pattern; and
   (b) a dependent pattern (subsequent) which is information representing an applied pattern for a participating system having a call sequential number immediately subsequent to the call sequential number of the participating system whose applied pattern is the pattern, and the applied pattern determination unit specifies the applied pattern for each of the participating systems represented by a service characteristic table, such that the applied pattern is a pattern satisfying the constraint condition corresponding to the service characteristic of the participating system and satisfying at least one of (A) and (B) as follows:
   (A) the applied pattern for the participating system having the call sequential number immediately previous to the call sequential number of the participating system corresponds to the applied pattern represented by the dependent pattern (previous) corresponding to the participating system; and
   (B) the applied pattern for the participating system having the call sequential number immediately subsequent to the call sequential number of the participating system corresponds to the applied pattern represented by the dependent pattern (subsequent) corresponding to the participating system.

6. The distributed transaction management system according to claim 1, wherein when a structure of the distributed transaction program is not uniquely determined, the distributed transaction program generation unit determines the structure of the distributed transaction program based on a predetermined rule or user input.

7. The distributed transaction management system according to claim 6, wherein the pattern information includes information for each pattern that represents whether application of the pattern is optional, and the structure of the distributed transaction program being not uniquely determined means that at least one optionally applied pattern is specified for the distributed transaction program.

8. The distributed transaction management system according to claim 6, wherein when at least one pattern whose application is optional is associated with a pattern rule program for a processing that follows a rule related to application of the pattern, when the specified applied pattern includes an applied pattern whose application is optional and when the applied pattern is associated with a pattern rule program, the distributed transaction program generation unit executes the pattern rule program in order to uniquely determine the structure of the distributed transaction program.

9. A distributed transaction management method comprising:

a computer receiving distributed transaction flow information defining respective call sequential numbers of a plurality of participating systems to be called in a distributed transaction, the plurality of participating systems each being a system participating in the distributed transaction, and service characteristic information representing service characteristics as respective characteristics of the plurality of participating systems;

a computer specifying an applied pattern for each of the participating systems represented by the service characteristic information, based on pattern information including information for each pattern that represents a constraint condition of a service characteristic of a participating system as a call target, wherein the applied pattern is a pattern satisfying the constraint condition corresponding to the service characteristic of the participating system; and a computer generating a pattern-applied call program for each of the plurality of participating systems, and generating a distributed transaction program based on the pattern-applied call programs for the plurality of participating systems and a call sequence represented by the distributed transaction flow, the distributed transaction program including a plurality of pattern-applied call programs to be executed in the call sequence, wherein the pattern-applied call program for each of the plurality of participating systems is a program obtained by applying a pattern program to a call program whose call target is the participating system, and wherein the pattern program is a pattern program of the applied pattern specified for the participating system among a plurality of pattern programs listed for the respective patterns.

\* \* \* \* \*